United States Patent [19]

Peck

[11] Patent Number: 4,897,934
[45] Date of Patent: Feb. 6, 1990

[54] VAPOR PHASE PROCESSING SYSTEM

[75] Inventor: Douglas J. Peck, North Andover, Mass.

[73] Assignee: Emhart Industries, Inc., Farmington, Conn.

[21] Appl. No.: 84,963

[22] Filed: Aug. 13, 1987

[51] Int. Cl.[4] .............................. F26B 19/00
[52] U.S. Cl. ............................ 34/78; 34/231; 432/197
[58] Field of Search .............. 34/78, 220, 216, 242, 34/231; 432/197

[56] References Cited

U.S. PATENT DOCUMENTS

| | | | |
|---|---|---|---|
| 4,285,668 | 8/1981 | Pepe | 34/242 X |
| 4,389,797 | 6/1983 | Spigarelli et al. | 34/78 X |
| 4,628,616 | 12/1986 | Shirai et al. | 34/78 |
| 4,658,513 | 4/1987 | Strattan | 34/78 |
| 4,698,915 | 10/1987 | Dickinson | 34/78 X |

Primary Examiner—Henry Bennett
Attorney, Agent, or Firm—Spencer T. Smith

[57] ABSTRACT

The level of vapor generated by heaters located in boiling electronic liquid contained in a vessel is maintained at a first level below the path of travel of work product and is elevated to a second level above the work product to process the work product. After a selected processing time the vapor level is lowered to the lower level so that the work product will not be overheated.

3 Claims, 3 Drawing Sheets

VAPOR PHASE PROCESSING SYSTEM

In a vapor phase processing system, a contained electronic liquid is heated by heaters submerged within the contained liquid to generate a zone of hot saturated vapor. Work product is delivered into the vessel through a long inlet throat, is processed by the hot saturated vapor and then exits the system through a long exit throat. The long throats are surface cooled to condense escaping vapor and aerosol to minimize the loss of these vapors. The conveyor defines a continuous substantially horizontal path across the vessel.

It is an object of the present invention to minimize vapor loss in such a system.

It is another object to control the processing time of such a system.

Other objects and advantages of the present invention will become apparent from the following portion of the specification and from the following drawings which illustrate in accordance with the mandate of the patent statutes a presently preferred embodiment incorporating the principles of the invention.

Referring to the drawings.

Figure 1:
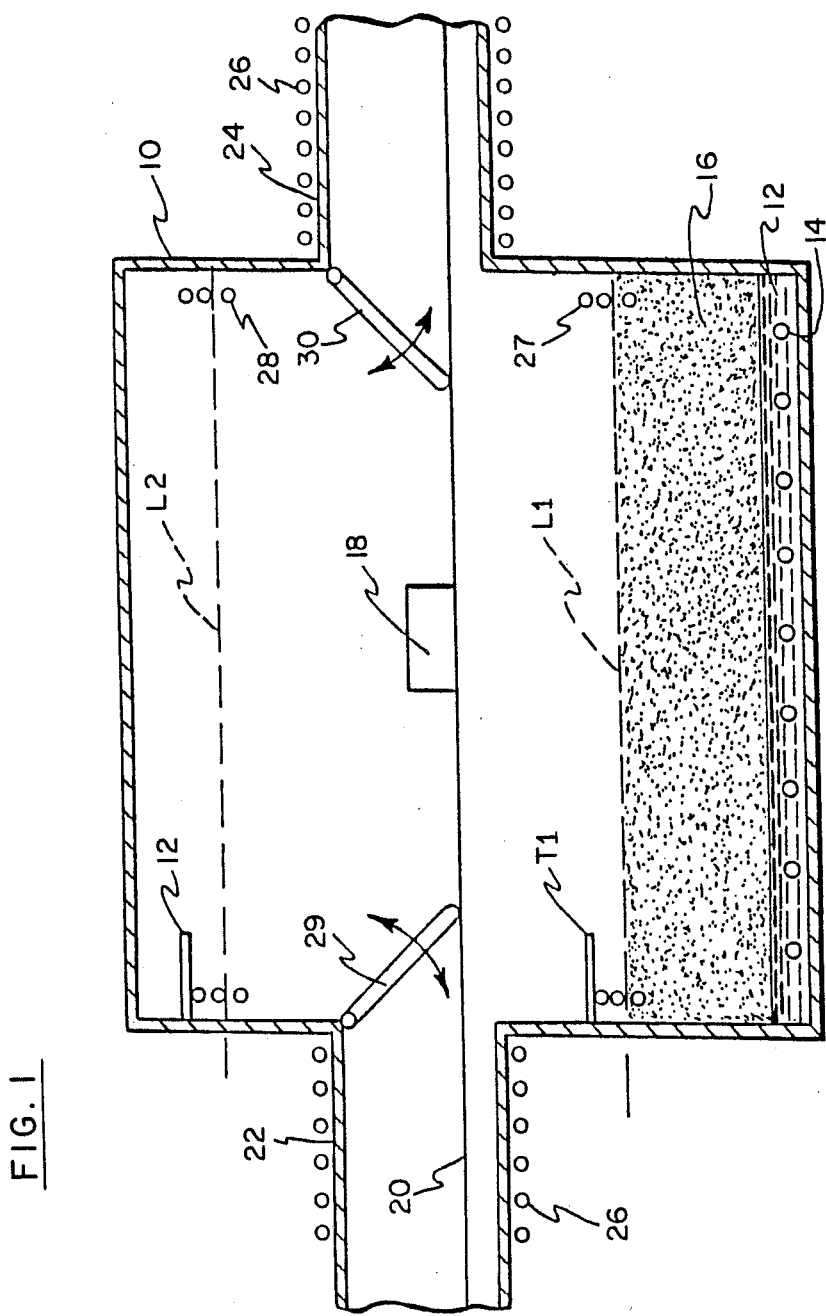
FIG. 1 is a cross-sectional view of a vapor phase processing system made in accordance with the teachings of the present invention.

A vapor phase processing system includes a vessel or tank 10 which contains an electronic liquid 12. The contained electronic liquid 12 is heated to boiling by heaters 14 within the electronic liquid 12 to generate a saturated vapor which is in thermal equilibrium with the boiling liquid. Work product 18 is placed on a conveyor 20 which carries the work product 18 through the inlet throat 22 into the vessel for processing and carries the processed work product 18 through the exit throat 24 to a pick up location outside the machine. The inlet 22 and exit 24 throats are surface cooled by cooling elements 26 to reduce vapor loss across the inlet and outlet throats. The level of the saturated vapor zone can be defined at either a lower level L1 below the work product's path through the vessel or at an upper level L2 above the work product's path through the vessel 10.

When cooling liquid is circulated through the vessel lower condensing coils 27 (see FIG. 2) the upper level of the saturated vapor zone can be maintained at the lower vapor level L1. When cooling liquid is circulated only through the vessel upper condensing coils 28, the upper level of the saturated vapor zone can be maintained at the upper level L2.

Figure 3:
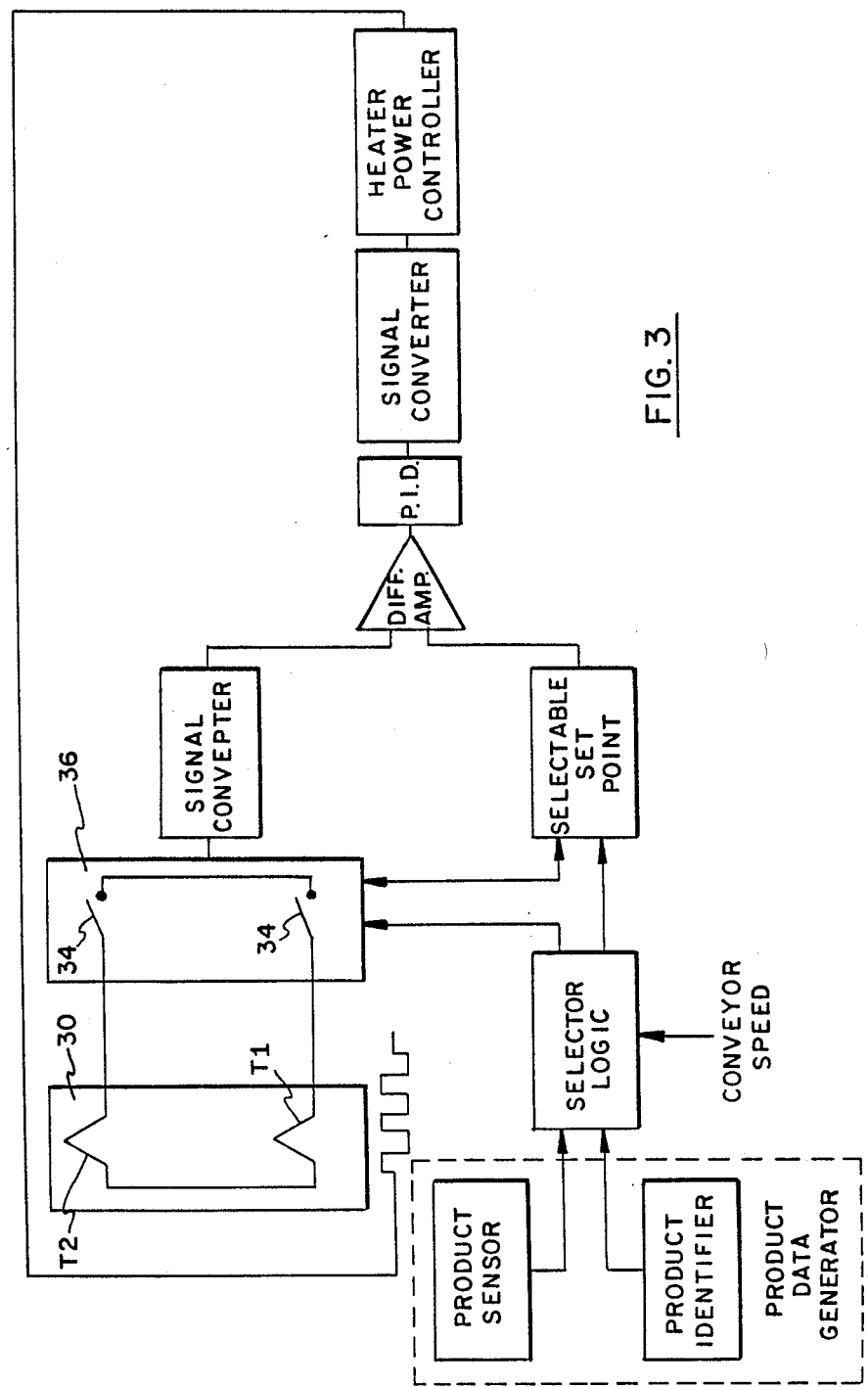
FIG. 3 is a schematic diagram illustrating the structure for controlling the operation of the heaters shown in FIG. 1.

Temperature sensors T1, T2 (thermocouple elements) protruding into vessel 10 sense existing temperatures at specific vertical locations. As can be seen from FIG. 3, each thermocouple is connected to an associated switch 34 in a selectably setable height selector 36. Selector Logic operates on data received from a Product Data Generator which can include a Product Sensor for sensing work product at a specific position as it is conveyed through the system. The Product Sensor can, in its simplest form, be an optical switch operated when the work product interrupts a beam of light. The Product Data Generator may also include a Product Identifier which, in its simplest form, can be a thumb wheel switch manually setable to identify the specific work product being processed. A bar code reader might perform both of these functions. The Selector Logic, based on this information, as well as on other information such as conveyor speed, determines which thermocouple T1, T2 is to be made operable and sets the selectable Set Point at the temperature which that thermocouple should sense if the saturated vapor zone has the corresponding level. The output signal from the height selector 36 which is converted by a Signal Converter, is delivered with the Selectable Set Point signal to a difference amplifier which supplies a proportional-integrator-derivative controller (PID). The output of the PID, which is representative of a difference between the actual and desired temperatures at the selected thermocouple and which is converted by a Signal Converter, is supplied to the Heater Power Controller to control heater power to eliminate any difference between the actual and desired temperatures at the selected thermocouple. This action results in either increased or decreased boiling by the electronic liquid (12) to produce the quantity of vapor necessary to satisfy thermocouples $T_1$ and $T_2$.

Figure 2:
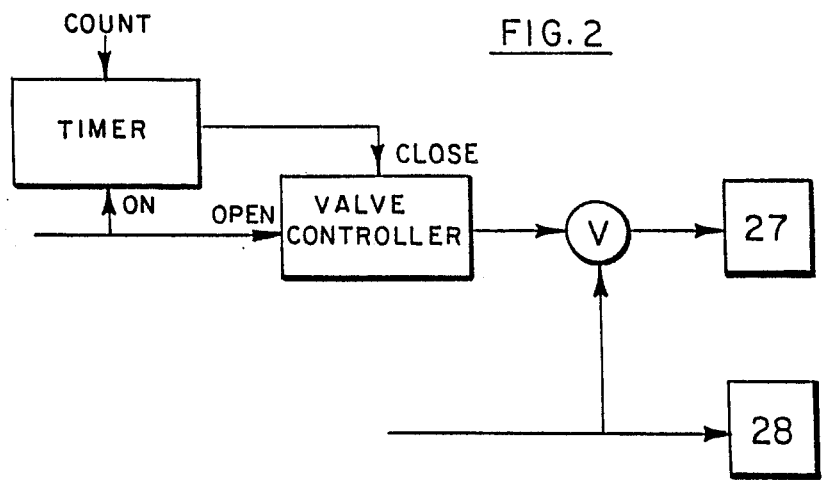
FIG. 2 is a schematic diagram illustrating the operation of the upper and lower vessel condensing coils.
Figure 4:
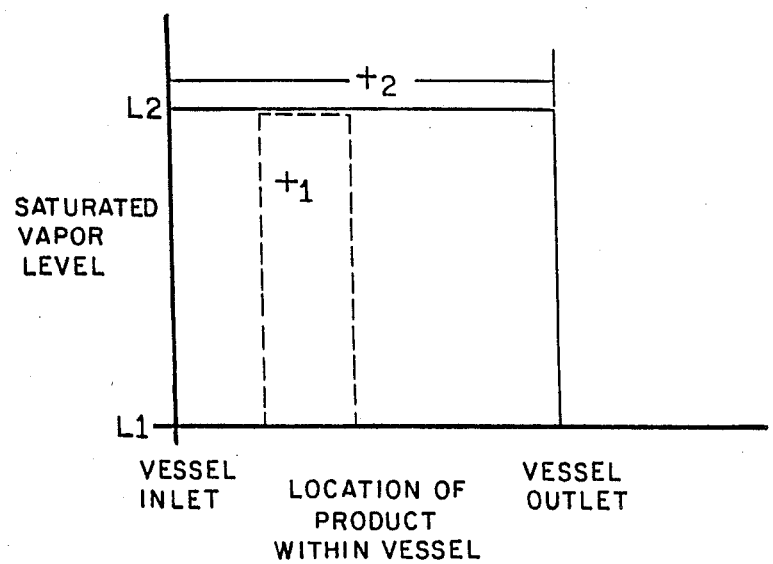
FIG. 4 is a plot of saturated vapor level versus location of work product in the vessel.

As can be seen from FIG. 2, cooling liquid is continuously circulated to the upper condensing coils 28 and is also circulated through the lower condensing coils 27 whenever the valve V is open. The Valve Controller which will open or close the valve V is operable for selected periods of time defined by the setable count of a Timer. As can be seen from FIG. 4, the time not only can correspond to a portion (t1) or the entire time (t2) it takes for the work product to be conveyed across the vessel, but the shorter time (t1) can start at a specific lateral location within the vessel. This enables preheating of the work within the vessel followed by immediate raising of the vapor level over the work to effect the desired processing (soldering, for example) for a desired duration of vapor exposure time. This is followed by the cooling of the part induced by immediately lowering the vapor level to lower level, L1, in response to cooling liquid flow which begins in lower coil 27. This product cooling thereby minimizes the problems which arise with prolonged heating of the work product and allows for product drying of condensed vapors prior to conveyance across the exit throat 24.

In an alternate configuration, vessel 10 may be provided with isolation doors 29, 30 which provide vapor seals during processing of product 18 within vessel 10. Upon entry of product 18 into vessel 10 and prior to elevating the vapor height from L1 to L2, conveyor 18 is stopped and the vapor seals are closed. The vapors rising from L1 to L2 are confined by doors 29, 30 preventing their escape to inlet throat 22 and outlet throat 24. Following product processing and the lowering of the vapor level to L1 and product cooling and drying, the doors 29, 30 are opened, the conveyor 20 is activated and finished product is conveyed out of vessel 10 and into the exit throat 24.

We claim:

1. A vapor processing system comprising:
   a vessel for containing a processing vapor,
   means for heating an electronic liquid contained within said vessel to generate saturated vapor;
   means for conveying work product through said vessel along a substantially horizontal path, first condensing means for defining a lower level first defining means of said saturated vapor at a selected or adjustable level below said path, second means for defining an upper level second defining means of said saturated vapor at a selected or adjustable level above said path; and means for operating said second defining means for at least a portion of the time the work product is located within said vessel whereby the saturated vapor will envelop and process the work product; and means for operating said first defining means for the remaining portion of the time whereby the saturated vapor will be maintained below the path thereby minimizing vapor loss along the path out of the vessel.

2. A vapor processing system according to claim 1 further comprising:
   upper condensing coil means,
   lower condensing coil means,
   said first defining means including means for supplying cooling liquid only to said upper condensing coil means, and
   said second defining means including means for co-jointly supplying cooling liquid to said upper and lower condensing coil means.

3. A vapor processing system according to claim 2, further comprising means for sealing the vapor vessel.

* * * * *